Sept. 20, 1932.  J. P. GREEN  1,878,772
REFRIGERATION SYSTEM
Filed Oct. 4, 1928  4 Sheets-Sheet 4

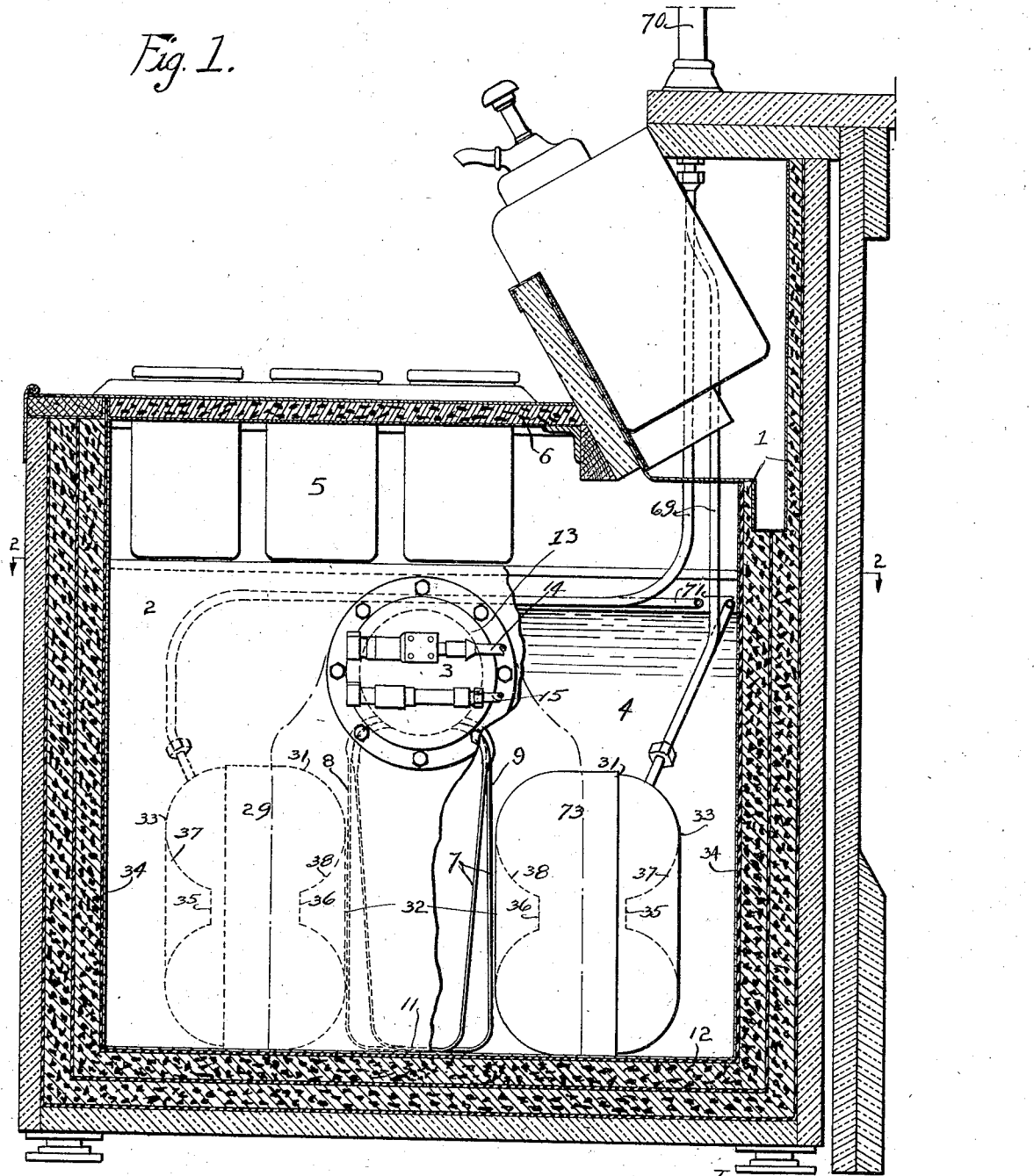

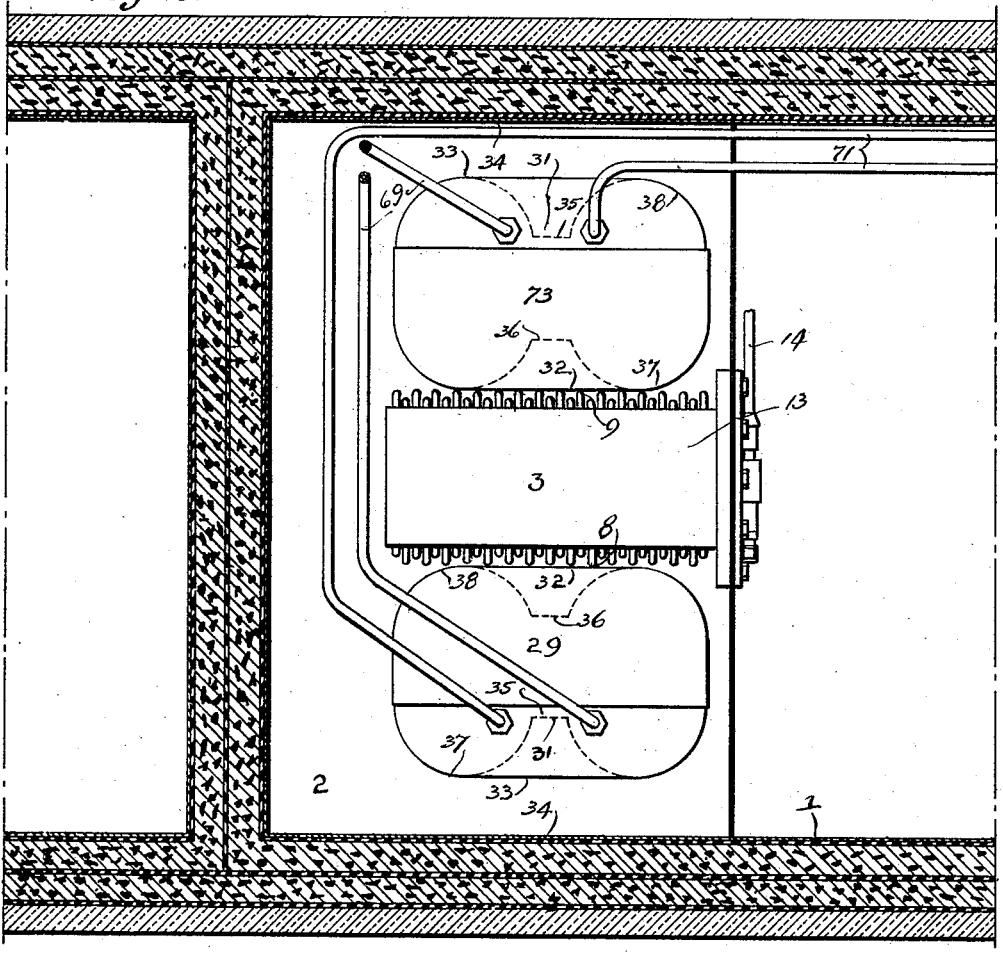

Patented Sept. 20, 1932

1,878,772

UNITED STATES PATENT OFFICE

JOHN P. GREEN, OF PHILADELPHIA, PENNSYLVANIA

REFRIGERATION SYSTEM

Application filed October 4, 1928. Serial No. 310,289.

My invention relates to means for and methods of refrigeration, and it has for one object the provision of refrigerating apparatus particularly applicable to soda fountains and the like that shall be characterized by the low temperatures to which the beverage fluid may be cooled.

Another object of my invention is to provide a refrigerating system, wherein fluid is cooled by passing the same over a heat-conducting means, as well as over a frozen portion of the fluid itself.

A further object of my invention is to provide a beverage-cooling unit characterized by its simplicity of design; by its ease of construction; by the relatively long passage afforded the beverage fluid in a casing of minimum dimensions; by the greatly increased rate of heat transfer afforded from the beverage fluid; and by the provision of a beverage chamber.

With these and other applications in mind, my invention further consists in the details of construction and operation, hereinafter described, claimed and illustrated in the accompanying drawings, wherein Fig. 1 is a detail, vertical sectional view of refrigerating apparatus embodying my invention;

Fig. 2 is a horizontal sectional view taken on the line 2—2 of Fig. 1;

Figure 5:
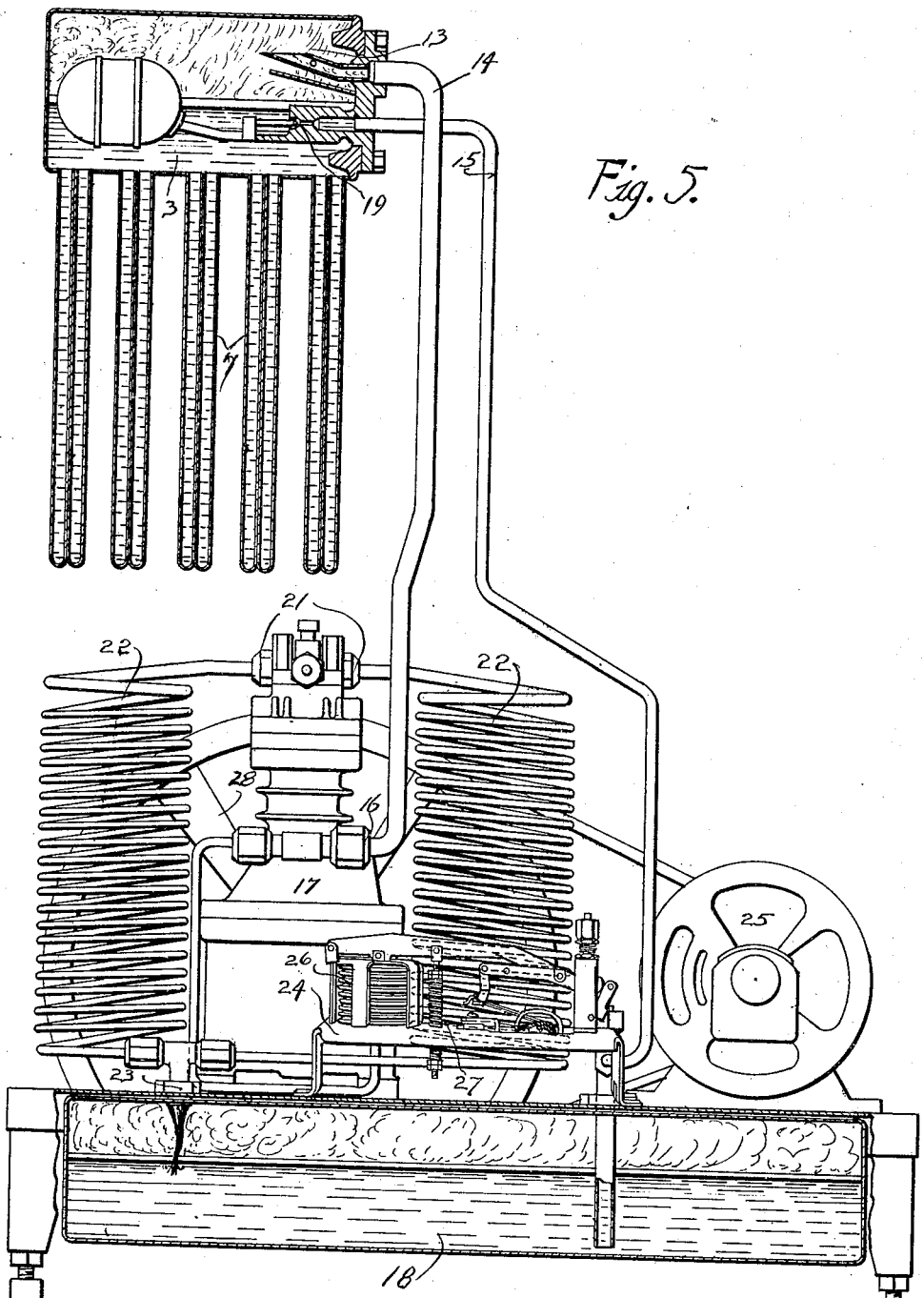
Fig. 5 is a diagrammatic view of standard refrigerating apparatus with which my invention is associated.

Referring to Figs. 1, 2, and 5, a housing 1 of usual design is provided with a container 2 for a refrigerating unit 3 and a liquid bath 4. A plurality of jars 5 may be supported in an upper horizontal wall 6 of the housing 1 immediately above the level of the liquid bath 4.

The refrigerating unit 3 comprises a plurality of refrigerating coils or loops 7 adapted to form approximately flat sides 8 and 9. A lower end 11 of the coils 7 are directly supported on a horizontal bottom wall 12 of the receptacle 2. The upper ends of the coils 7 extend into a horizontally positioned header 13 which is immersed in the liquid bath 4. The header 13 is provided with upper and lower pipes 14 and 15 which are respectively connected to the suction side 16 of a sulphur dioxide compressor 17 and a storage chamber 18 for the liquid sulphur dioxide. A float valve 19 controls the passage of liquid sulphur dioxide from the pipe 15 into the header 13, the valve 19 opening when the level of the sulphur dioxide in the header 13 falls below a predetermined point. An exhaust side 21 of the compressor 17 is connected to condensing coils 22 for the sulphur dioxide gas, the condensed sulphur dioxide being discharged from the coils 22 through a pipe 23 to the storage tank 18. Adjustable automatic temperature-control means for the system is provided comprising a switch 24, which controls the operation of a driving motor 25 for the compressor, and a pressure-responsive operating device 26 for the switch 24 which is connected to the suction side 16 of the compressor. Adjustable means 27 is also provided, whereby the operating temperature of the refrigerating coils 7 which is to be automatically maintained, may be varied, at will.

In operation, assuming the temperature of the water bath 4 above a predetermined amount, the operation of the compressor 17 by the driving motor 25 causes a decrease in pressure in the refrigerating coils 7 and header 13, so that the sulphur dioxide liquid starts to boil. As the liquid is converted into a gas, heat is absorbed from the liquid bath 4 to supply the latent heat of vaporization. The sulphur dioxide gas thus formed accumulates in the upper portion of the header 13 and is withdrawn therefrom through the pipe 14 by means of the compressor 17. The sulphur dioxide gas is then discharged into the cooling coils 2 under such pressure as to cause condensation, the resulting heat being removed by air currents established by a fan 28 actuated by the motor 25. The condensed sulphur dioxide gas now passes through the pipe 23 to the storage chamber 18 under pressure. The sulphur dioxide liquid is finally returned to the refrigerating unit 3 through the pipe 15 and the control valve 19 when the level of the liquid in the cooling coils 7 and header 13 falls below the predetermined point.

When the temperature of the cooling coils 7 drops to a valve determined by the adjustment of the means 27, the pressure in the suction side of the compressor 17 is such that the device 26 causes the operation of the switch 24 and the consequent de-energization of the motor 25. When the temperature of the coils 7 increases above the desired value, the pressure of the sulphur dioxide gas in the header 13 is also increased, with the result that the device 26 functions to cause the closing of the switch 24 and the re-energization of the motor 25. Thus the cooling coils 7 are maintained at a predetermined operating temperature which is readily varied from one valve to another by adjusting the means 27.

Experience has shown that the lowest temperature to which the water bath 4 may be cooled without freezing is 37° F., inasmuch as the circulation of the liquid stops at that temperature. Accordingly the effective cooling temperature of the liquid bath 4 never drops below 37° F. In certain applications, as, for instance, soda fountains and the like, it is desirable to obtain a much lower effective cooling temperature. This desired result is accomplished in my invention by the provision of means which utilizes the heat of fusion of ice, as well as the cooling effect of a heat-conducting fin. To this end, I provide a beverage-cooling unit 29 comprising a casing 31 preferably of toroidal form so as to withstand high pressures. The casing 31 is mounted on the bottom wall 12 of the liquid receptacle 2 with one side 32 thereof in contact with the adjacent side 8 of the cooling coils 7. An outer side 33 faces an adjacent vertical side wall 34 of the receptacle 2.

Figure 3:
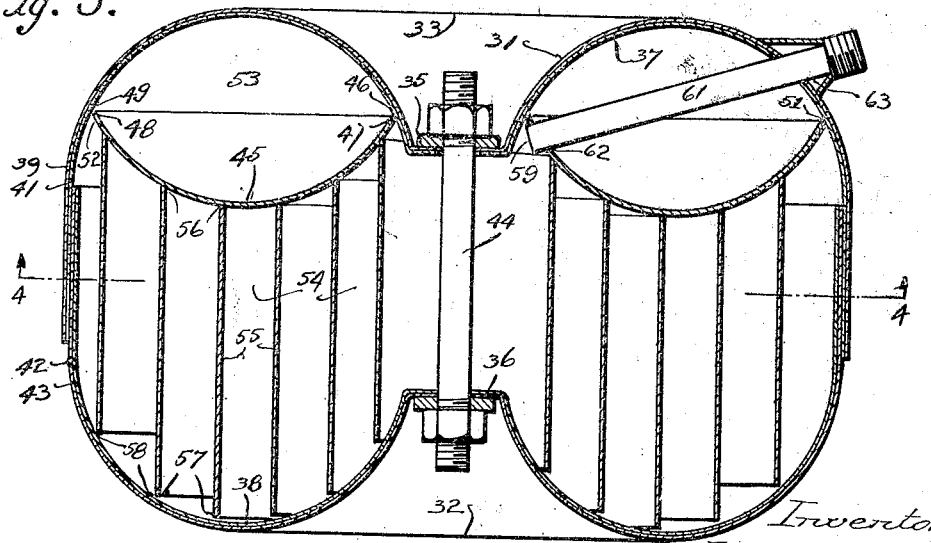
Fig. 3 is a horizontal sectional view taken on the line 3—3 of Fig. 4 of the beverage-cooling unit constituting one of the features of my invention, the sectional plane being taken on the line 3—3 of Fig. 4.

The side walls 32 and 33 of the casing 31 are provided with centrally recessed portions 35 and 36, and annular side portions 37 and 38 of curved cross section. The casing 31 may comprise sections 39 and 41, outer edge portions 42 and 43 of which are in telescoping engagement, as shown in Fig. 3. These edge portions may be welded or otherwise secured together. The centrally recessed portions 35 and 36 are rigidly secured in position by means of a bolt 44. An annular partition 45 is operatively associated with the outer side portion 37, an inner edge 46 being rigidly secured to an inner edge portion 47 of the side portion 37. An outer edge 48 of the partition 45 is positioned immediately adjacent to an outer edge portion 49 of the annular side portion 37, leaving a relatively small annular passage 51 therebetween. An edge portion of the partition 45 is recessed to provide an enlarged auxiliary passage 52 through which the beverage fluid may pass into an annular chamber 53 formed between the partition 45 and the annular side portion 47, in the event that the passage 51 is sealed by freezing or otherwise. The partition 45 is of curved cross-section and so positioned as to approximately parallel the opposite annular side portion 38. The annular partition 45 and the annular side portion 38 are thus approximately equally spaced between the inner and outer diameters thereof, as shown in Fig. 3.

In accordance with my invention, the space between the partition 45 and the side 8 in contact with the cooling coils 7 is formed into a relatively long spiral passage 54 by means of a spiral plate 55, an outer edge 56 of which is adapted to abut against the curved surface of the partition 45 so as to form a fluid-tight connection therebetween, thereby preventing leakage from one turn of the spiral to the other along this side of the passage 54. An opposite edge 57 of the spiral 55 may be spaced slightly from the adjacent annular side portion 38 to form a passage 58 interconnecting the adjacent turns of the spiral passage 54. The passage 58 is normally closed by the freezing of an adjacent portion of the fluid in the spiral passage 54,—the fluid from the passage 54 passing over the large cooling surface afforded by the side 48 only when the ice within the passage 54 has entirely melted; all as will presently appear in greater detail.

Figure 4:
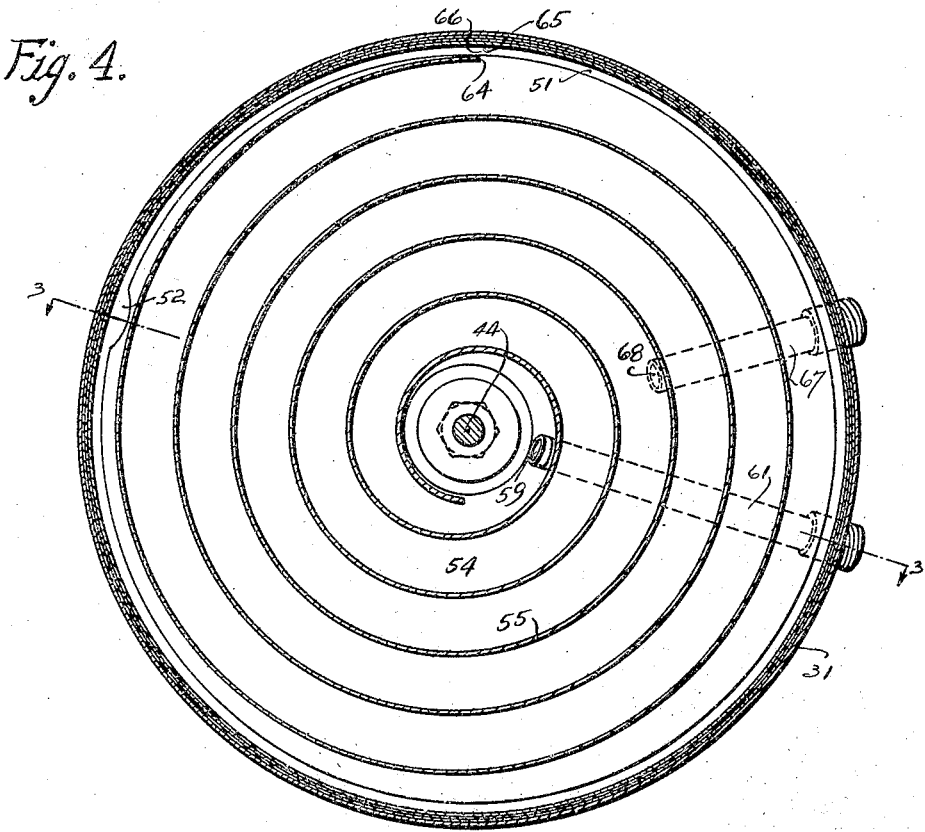
Fig. 4 is a sectional view taken on the line 4—4 of Fig. 3.

An inner end of the spiral plate 55 terminates, as shown in Fig. 4, to form an inlet passage portion 59 which is supplied with relatively warm beverage fluid through a supply pipe 61. The pipe 61 may extend from the casing 31 through an upper inner portion 62 of the partition 45 and an upper edge portion 63 of the annular side portion 37. An outer end 64 of the plate 55 terminates just inwardly of an adjacent side portion 65 of the casing 31. A passage 66 being formed therebetween which extends completely around the casing 31. The cooled beverage may be removed from the storage chamber 53 through a discharge pipe 67. Should the beverage contain gases, then an inlet opening 68 of the pipe 67 is positioned below the upper portion of the chamber 53 containing gases. The discharge pipe 67 may be connected by a pipe 69 to a main dispensing valve 70 while the supply pipe 61 is connected by the pipe 71 to a storage tank (not shown) for the beverage fluid.

In operation, the temperature-control means 27 is first adjusted, so that the cooling coils 7 establish the ice region indicated by the dot-and-dash lines of Fig. 1, wherein it is noted that the ice is formed in the spiral passage 54, extending across approximately one-half the width thereof. Assuming a load on the system due to the operation of the valve 70, the relatively warm beverage fluid is forced through the pipe 61 into the central portion 59 of the spiral passage 54. The beverage fluid then flows through the relatively long spiral passage 54, losing heat due to the conducting effect of the walls of the spiral passage 54 which in effect constitute a plurality of heat-conducting fins. Heat is also lost by reason of the movement of the beverage fluid over the ice in the spiral passage 54. When the fluid finally reaches the outer end of the passage 54, the temperature thereof has been considerably reduced below 37° F. The fluid now flows through the annular passage 51 between the outer edge of the partition 45 and the annular side portion 37 of the casing 31, as well as the opening 52. Should the passage 51 become sealed by an ice formation, the opening 52 still affords a connection between the storage chamber 53 and the spiral passage 54. The cooled beverage fluid collects in the chamber 53 and is discharged therefrom through the pipe 67, the opening of which is sufficiently below the upper level of the cooled beverage fluid as to prevent the discharge of any gases therethrough. It is noted that during the beverage cooling operation, ice is automatically maintained in the spiral passage 54 to the desired depth by the refrigerating apparatus shown particularly in Figs. 1 and 5.

Should an unusually heavy load occur on the beverage system, the frozen fluid in the spiral passage 54 constitutes a reserve, permitting the continued cooling of the beverage fluid without necessitating an adjustment of the temperature-control means 27. If the ice in the passage 54 is entirely removed, then the seal between the passage 54 and the side of the casing 31 adjacent the side 8 of the coils 7 is destroyed, permitting the beverage fluid to flow over the relatively large heat-radiating surface afforded by this side of the casing 31. The heat radiation from the side 8 is relatively large due to its broad surface area and also to the fact that it is in contact with the cooling coils 7. If the over load continues and becomes permanent, then it is desirable to adjust the means 27 on the switch operating device 26 so as to maintain a lower operating temperature in the refrigerating coils 7.

Should it be desirable to have two different beverages simultaneously cooled, then a beverage-cooling unit 73 corresponding to the refrigerating unit 29 is positioned in engagement with the side 9 of the cooling coils. The operation of the unit 73 is the same as that just described for the refrigerating unit 29.

While I have shown only one form of embodiment of my invention, for the purpose of describing the same and illustrating its principles of construction and operation, it is apparent that various changes and modifications may be made therein without departing from the spirit of my invention. I desire, therefore, that only such limitations shall be imposed thereof as are indicated in the appended claims or as are demanded by the prior art.

I claim:

1. Apparatus of the character described comprising refrigerating means adapted to form ice within a predetermined region, and means comprising a wide beverage passage having a longitudinal portion thereof extending into said freezing region, the width of said passage being of such dimension that the beverage may be frozen to a predetermined extent only transversely of said passage, whereby another longitudinal portion of said passage remains unobstructed, the walls of said passage constituting heat-conducting fins for transferring heat from the beverage.

2. Apparatus of the character described comprising refrigerating means adapted to form ice within a predetermined region, and means comprising a long, wide and shallow beverage passage having a longitudinal portion thereof extending into said freezing region, the width of said passage being of such dimension that the beverage may be frozen to a predetermined extent only transversely of said passage, whereby another longitudinal portion of said passage remains unobstructed.

3. Apparatus of the character described comprising refrigerating means adapted to form ice within a predetermined region, and means comprising a long, wide and shallow beverage passage having a side thereof extending into said freezing region, the width of said passage being of such dimension that the beverage may be frozen to a predetermined extent along the side only of said passage, whereby the other side of the passage remains unobstructed.

4. Apparatus of the character described comprising refrigerating means adapted to form ice within a predetermined region, and means comprising a beverage passage and a storage chamber for the cooled beverage, said storage chamber being positioned on one side of said passage, the other side of said passage extending into said freezing region, so that ice may be formed in a portion only of said passage.

5. Refrigerating apparatus comprising means adapted to form ice within a certain region, and a casing having one side portion extending into said region, said casing having a spiral beverage passage formed therein, said passage having a continuous portion inside said region and a continuous portion outside said region.

6. In a refrigerating system, the combination with a container for a liquid, of refrigerating means positioned in said liquid, a casing positioned in operative relation to said refrigerating means, said casing having a spiral passage and a storage chamber, a beverage supply pipe connected to the inner end of said spiral passage, the outer end of said passage being connected to said chamber, and a discharge pipe leading from said chamber for the cooled beverage.

7. Refrigerating apparatus comprising a casing, a partition forming a storage chamber between itself and said casing, and means rigidly secured to said partition forming a spiral beverage passage communicating with said chamber.

8. Refrigerating apparatus comprising a casing of toroidal form, a partition forming an annular storage chamber between itself and said casing, a spiral plate extending from said partition into close proximity with a wall of said casing, said spiral plate forming a beverage passage, said chamber and said passage being inter-communicating, and inlet and outlet pipes connected to said chamber and said passage.

JOHN P. GREEN.